US012296296B2

(12) United States Patent
Kallstrand et al.

(10) Patent No.: US 12,296,296 B2
(45) Date of Patent: May 13, 2025

(54) SYNERGETIC SYSTEM AND METHOD FOR WASTE TREATMENT

(71) Applicant: Dürr Systems AB, Gothenburg (SE)

(72) Inventors: Ake Kallstrand, Gothenburg (SE); Lisa Larsson, Visby (SE)

(73) Assignee: Dürr Systems AB, Gothenburg (SE)

( * ) Notice: Subject to any disclaimer, the term of this patent is extended or adjusted under 35 U.S.C. 154(b) by 418 days.

(21) Appl. No.: 17/662,087

(22) Filed: May 5, 2022

(65) Prior Publication Data

US 2022/0355243 A1  Nov. 10, 2022

(30) Foreign Application Priority Data

May 5, 2021 (EP) ..................... 21172272

(51) Int. Cl.
*B01D 53/34* (2006.01)
*B01D 53/00* (2006.01)
(Continued)

(52) U.S. Cl.
CPC ........... *B01D 53/343* (2013.01); *B01D 53/00* (2013.01); *B01D 53/005* (2013.01); *B01D 53/84* (2013.01); *B01D 53/86* (2013.01); *B09B 3/60* (2022.01); *C02F 3/305* (2013.01); *F28D 13/00* (2013.01); *B01D 2257/2045* (2013.01);
(Continued)

(58) Field of Classification Search
CPC .... B01D 53/343; B01D 53/00; B01D 53/005; B01D 53/84; B01D 53/86; B01D 2257/2045; B01D 2257/2047; B01D 2257/302; B01D 2257/404; B01D 2257/406; B01D 2257/7025; B09B 3/60; C02F 3/305; C02F 2101/163; C02F 2303/10; F28D 13/00; F23G 7/07;
(Continued)

(56) References Cited

U.S. PATENT DOCUMENTS

| 5,352,115 A | 10/1994 | Klobucar |
| 5,823,770 A | 10/1998 | Matros et al. |
| 6,261,093 B1 | 7/2001 | Matros et al. |

FOREIGN PATENT DOCUMENTS

| CN | 201292859 Y | * 8/2009 |
| CN | 210832035 U | * 6/2020 |

(Continued)

OTHER PUBLICATIONS

Machine-generated English translation of KR 102036263, generated on Sep. 10, 2024.*
(Continued)

*Primary Examiner* — Fred Prince
(74) *Attorney, Agent, or Firm* — 2SPL Patent Attorneys PartG mbB; Kieran O'Leary

(57) ABSTRACT

A synergetic system for waste treatment is provided. The synergetic system includes a waste treatment system configured to perform biological treatment of waste. Additionally, the synergetic system includes a gas purification system configured to purify exhaust gas generated during the biological treatment of the waste. The synergetic system further includes a feeding system configured to feed excess heat from the gas purification system back to the waste treatment system. The waste treatment system is further configured to use the fed back excess heat for the biological treatment of the waste.

16 Claims, 6 Drawing Sheets

(51) Int. Cl.
  *B01D 53/84* (2006.01)
  *B01D 53/86* (2006.01)
  *B09B 3/60* (2022.01)
  *C02F 3/30* (2023.01)
  *F23G 7/07* (2006.01)
  *F28D 13/00* (2006.01)
  *C02F 101/16* (2006.01)

(52) U.S. Cl.
  CPC ........ *B01D 2257/2047* (2013.01); *B01D 2257/302* (2013.01); *B01D 2257/404* (2013.01); *B01D 2257/406* (2013.01); *B01D 2257/7025* (2013.01); *C02F 2101/163* (2013.01); *C02F 2303/10* (2013.01); *F23G 7/07* (2013.01); *F23G 2201/00* (2013.01); *F23G 2202/60* (2013.01); *F23G 2206/20* (2013.01); *F23G 2209/14* (2013.01); *F23G 2900/50208* (2013.01)

(58) Field of Classification Search
  CPC ........... F23G 2201/00; F23G 2202/60; F23G 2206/20; F23G 2209/14; F23G 2900/50208
  USPC ................ 210/603, 604, 612, 613, 151, 175
  See application file for complete search history.

(56) References Cited

FOREIGN PATENT DOCUMENTS

| DE | 102008010329 A1 | 9/2009 |
| KR | 102036263 B1 * | 10/2019 |
| WO | 9212938 A1 | 8/1992 |

OTHER PUBLICATIONS

Machine-generated English translation of CN 201292859, generated on Sep. 10, 2024.*
Machine-generated English translation of CN 210832035, generated on Sep. 10, 2024.*
David A. Lewandowski, „Design of Thermal Oxidation Systems for Volatile Organic Compounds, 2000, pp. 217-239, CRC Press LLC, Florida.
Dürr Group, "VOCSIDIZER reinigt Deponiegas & erzeugt Fernwärme", Company brochure.
Sven Meyer, „Elektrisch betriebene Abluftreinigungsanlage von Megtec ist besonders umweltfreundlich, Dürr Group, 2020, Company brochure.
Dürr Group, „Flameless Regenerative Thermal VOC Oxidation, 2020, Company brochure.

* cited by examiner

SYNERGETIC SYSTEM AND METHOD FOR WASTE TREATMENT

FIELD

The present disclosure relates to waste treatment. In particular, examples relate to a synergetic system and a method for waste treatment.

BACKGROUND

Landfill drain water is collected and treated due to its high pollution with organic and/or other substances. Processes for water treatment such as, e.g., the Fenton process require temperatures above ambient temperate and, hence, a significant amount of energy. Similarly, processes for mechanical biological treatment of waste or processes for water treatment in a sewage treatment plant require controlled temperatures at levels higher than ambient temperature and, hence, a significant amount of energy.

Furthermore, landfill gas emissions or gas emissions of waste treatment plants are treated separately using various purification techniques to comply with statutory emission limits.

There may be demand for improved waste treatment.

SUMMARY

The demand may be satisfied by the subject-matter of the appended claims.

An example relates to a synergetic system for waste treatment. The synergetic system comprises a waste treatment system configured to perform biological treatment of waste. Additionally, the synergetic system comprises a gas purification system configured to purify exhaust gas generated during the biological treatment of the waste. The synergetic system further comprises a feeding system configured to feed excess heat from the gas purification system back to the waste treatment system. The waste treatment system is further configured to use the fed back excess heat for the biological treatment of the waste.

Another example relates to a method for waste treatment. The method comprises performing biological treatment of waste using a waste treatment system. Additionally, the method comprises purifying exhaust gas generated during the biological treatment of the waste using a gas purification system. The method further comprises feeding excess heat from the gas purification system back to the waste treatment system using a feeding system. In addition, the method comprises using the fed back excess heat for the biological treatment of the waste in the waste treatment system.

Feeding back the excess heat from the gas purification system to the waste treatment system and using the fed back excess heat for the biological treatment of the waste in the waste treatment system may allow synergetic operation of the gas purification system and the waste treatment system. In particular, the use of the fed back excess heat for the biological treatment of the waste in the waste treatment system may allow to cover at least part of the energy demand of the waste treatment system. Accordingly, an overall energy consumption for the waste treatment may be reduced according to the proposed technology. Furthermore, the fed back excess energy may allow to optimize the process conditions for the biological treatment of the waste and, hence, allow to perform the biological treatment of the waste with high efficiency.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
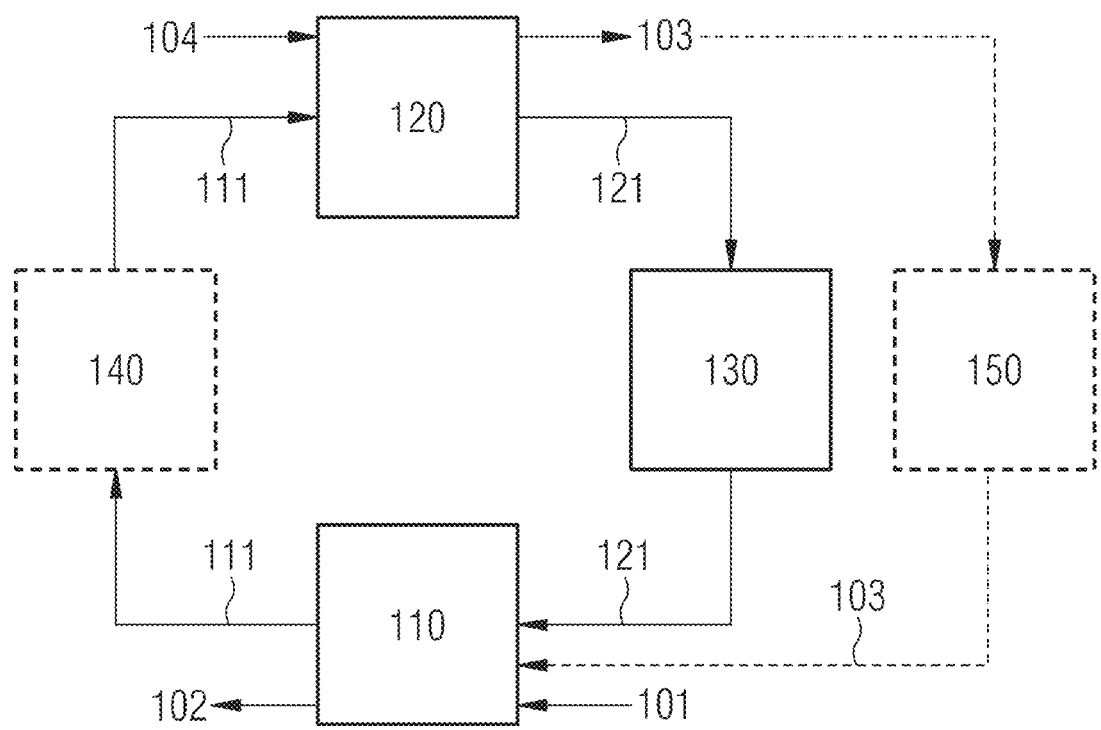
FIG. 1 illustrates a first example of a synergetic system for waste treatment.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an "or", this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1 schematically illustrates an exemplary synergetic system 100 for waste treatment. The synergetic system 100 comprises a waste treatment system 110 for treating waste 101.

In particular, the waste treatment system 110 is configured to perform biological treatment of the waste 101.

The waste 101 may in general be any type of waste that can be treated by means of a biological process. For example, the waste 101 may be solid waste, liquid waste, gaseous waste or a combination thereof. Biological treatment of waste may be any treatment of the waste 101 that comprises one or more biological processes and/or involves one or more organisms to convert organic components and/or inorganic components of the waste 101. For example, a biodegradable component of the waste 101 may be broken down by the biological treatment (e.g. composting, anaerobic digestion or aerobic digestion). In other examples, the biological treatment may be used for denitrification of the waste 101, i.e., for reducing nitrate in the waste 101. Similarly, the biological treatment may be used for reducing other inorganic components in the waste 101. The waste treatment system 110 may use various organisms, in particular microorganisms such as algae, fungi, bacteria or ciliates, for the biological treatment of the waste 101. For example, the waste treatment system 110 may be a wastewater treatment system for treating wastewater such as, e.g., landfill drain water, domestic wastewater, municipal wastewater or industrial wastewater. In other examples, the waste treatment system 110 may be solid waste treatment system such as a mechanical biological treatment system using mechanical waste sorting and biological treatment for treating solid waste such as domestic solid waste, municipal solid waste or industrial solid waste. However, it is to be noted that the waste treatment system 110 is not limited to the above examples.

The waste treatment system 110 is configured to output biologically treated material 102 resulting from the biological treatment of the waste 101. For example, the biologically treated material 102 may be purified wastewater, compost, digestate, residual unusable material, renewable fuel, recovered recyclable materials such as metals, paper, plastics, glass etc., or a combination thereof. The output biologically treated material 102 may, e.g., be reused, further treated (e.g. thermal treatment or recycling) or deposited in a landfill.

In addition to the biologically treated material 102, the biological treatment of the waste 101 generates exhaust gas 111 (e.g. an exhaust gas stream). The synergetic system 100 additionally comprises a gas purification system 120 coupled to the waste treatment system 110 and configured to purify the exhaust gas 111 generated during the biological treatment of the waste.

The gas purification system 120 is a system that receives the exhaust gas 111 at an inlet and removes impurities or one or more pollutants from the exhaust gas 111 so that a purified (cleaned) exhaust gas 103 is output (emitted/released) at an outlet of the gas purification system 120. The purified exhaust gas 103 may be released to the environment. A pollutant can be understood in this context as a substance that harms systems, animals, humans and/or the environment when occurring in a specific quantity or concentration (e.g. defined as mass of the pollutant per unit volume of the exhaust gas 111 or as number of pollutant particles per unit volume of the exhaust gas 111). Accordingly, the purification of the exhaust gas 111 may include, e.g., a detoxification, denitrification, deacidification, desulfurization, dedusting or a combination thereof. For example, organic and/or inorganic pollutants may be removed from the exhaust gas 111 by the gas purification system 120. The organic and/or inorganic pollutants may, e.g., be nitrogen oxides ($NO_x$), methane ($CH_4$), sulfur oxides ($SO_x$), hydrogen fluoride (HF), ammonia ($NH_3$), hydrogen chloride (HCl), dioxins, furans or pollutants of the basic structure $C_xH_yO_z$ (C denotes carbon; H denotes hydrogen; O denotes oxygen; x, y, and z are natural numbers).

The gas purification system 120 may use various methods to purify the exhaust gas 111. For example, the gas purification system 120 may use known concentration methods/processes (e.g., by means of absorption, adsorption or membranes), condensation methods, catalytic methods, non-catalytic-chemical methods, methods using a non-thermal plasma (cold oxidation), biological methods (e.g., bioscrubbers, biofilters), mechanical methods, electromechanical methods, thermal methods or a combination of several of the above-mentioned methods. According to some examples, the gas purification system 120 may be configured to purify the exhaust gas 111 by a thermal method such as Regenerative Thermal Oxidation (RTO) or a catalytic method such as Regenerative Catalytic Oxidation (RCO). The gas purification system 120 may use one or more flames or a flameless process for purifying the exhaust gas 111. For example, the gas purification system 120 may be configured to purify the exhaust gas 111 by flameless RTO or flameless RCO. However, it is to be noted that the gas purification system 120 is not limited to the above exemplary gas purification techniques.

An efficiency of the one or more biological processes taking place in the waste treatment system 110 for treating the waste 101 depends on the environmental conditions within the waste treatment system 110. In particular, the efficiency of the one or more biological processes depends on the ambient temperature within the waste treatment system 110. A biological process is most efficient in a specific temperature range. In case the ambient temperature is above or below the specific temperature range, the efficiency of the biological process decreases. Accordingly, adjusting the ambient temperature within the waste treatment system 110 to the specific temperature range may allow to optimize the efficiency of the biological waste treatment.

Adjusting the ambient temperature within the waste treatment system 110 requires heat. In many conventional systems, heat is not available such that the ambient temperature within the waste treatment system 110 is below the specific temperature range. Accordingly, the efficiency of the biological processes taking place in the waste treatment system 110 is decreased. For example, the efficiency of the biological processes may vary with the seasons of the year (e.g. be more efficient in summer than in the winter due to the higher temperatures in summer). In other conventional systems, the heat is generated using external energy such as electrical energy or fossil fuels. For example, electrical energy or fossil fuel may be converted to heat for heating the waste 101 prior to or during the biological treatment of the waste 101. Alternatively or additionally, a treatment space of the waste treatment system 110 in which the biological treatment of the waste 101 takes place may be heated. The conventionally used external energy increases the efficiency but also the costs for waste treatment. Further, in case fossil fuel or electric energy from non-regenerative sources are used for heating, the waste treatment causes greenhouse gas emission.

The gas purification system 120 generates excess (surplus) heat 121 during operation. The excess heat 121 is heat energy recovered at the gas purification system 120 from the purification process for purifying the exhaust gas 111. The excess heat 121 may be understood as waste heat of the gas purification system 120 as it is a "waste product" of the purification process. For example, the excess heat may be recovered in a process chamber of the gas purification system 120 or from a gas stream processed by the gas purification system 120 such as the purified exhaust gas 103.

According to the proposed architecture, the excess heat 121 of the gas purification system 120 is synergistically used for the waste treatment system 110. In particular, the synergetic system 100 comprises a feeding system 130 configured to feed the excess heat 121 from the gas purification system 120 back to the waste treatment system 110. The waste treatment system 110 is further configured to use the fed back excess heat 121 for the biological treatment of the waste 101.

The use of the fed back excess heat 121 for the biological treatment of the waste 101 in the waste treatment system 110 may allow to optimize (increase) the efficiency of the biological waste treatment as the fed back excess heat 121 may be used for adjusting (increasing) the ambient temperature within the waste treatment system 110. Hence, an efficiency of the biological treatment of the waste 101 may be increased compared to conventional systems not using heat for temperature optimization. Further, compared to conventional systems using external energy for adjusting the ambient temperature within the waste treatment system 110, the fed back excess heat 121 may allow reduce the consumption of external energy for adjusting the ambient temperature within the waste treatment system 110 as the fed back excess heat 121 may allow to cover at least part of the heat demand of the waste treatment system 110. Accordingly, an overall energy consumption and an overall greenhouse gas emission of the synergetic system 100 for the treatment of the waste 101 may be reduced compared to conventional approaches. Additionally, the biological treatment of the waste 101 may be performed by the waste treatment system 110 at high efficiency and/or at shorter time with reduced energy consumption.

The waste treatment system 110 may use the fed back excess heat 121 in various ways. For example, the waste treatment system 110 may be configured to use the fed back excess heat 121 for heating the treatment space in which the biological treatment of the waste 101 takes place. Alternatively or additionally, the waste treatment system 110 may be configured to use the fed back excess heat 121 for heating the waste 101. By heating the treatment space and/or the waste 101, the efficiency of the biological treatment of the waste 101 may be increased as described above.

The feeding system 130 may feed the excess heat 121 in various ways back to the waste treatment system 110. For example, feeding system 130 may feed a heat transport medium such as a fluid (e.g. water or thermal oil) or a gas (e.g. air or steam) from the waste treatment system 110 to the gas purification system 120 such that the heat transport medium is heated by the excess heat 121 and feed the heated heat transport medium back to the waste treatment system 110. The waste treatment system 110 may use the heat stored in the heated heat transport medium for the biological treatment of the waste 101 (e.g. as described above).

The synergetic system 100 further comprises an exhaust gas transport system 140 configured to transport the exhaust gas 111 from the waste treatment system 110 to the gas purification system 120. The exhaust gas transport system 140 may be a separate system (as illustrated in FIG. 1) or be part of one of the waste treatment system 110 and the gas purification system 120. The exhaust gas transport system 140 collects the exhaust gas 111 at the waste treatment system 110 and transports the exhaust gas 111 to the gas purification system 120. The exhaust gas transport system 140 may comprise piping and optionally one or more further elements such as a pump, a ventilator, a blower or a compressor for transporting the exhaust gas 111.

As indicated in FIG. 1, the gas purification system 120 may be further configured to receive and purify further exhaust gas 104. The further exhaust gas 104 is received from a different source than the waste treatment system 110. In some examples, another source of exhaust gas may be located nearby the waste treatment system 110 such that the gas purification system 120 may be used for purifying the exhaust gases 111 and 104 of both sources. For example, if the waste treatment system 110 is a wastewater treatment system for treating drain water of a landfill, not only the exhaust gas 111 of the waste treatment system 110 may be purified by the gas purification system 120 but also gas emissions of the landfill itself.

According to some examples, also the purified exhaust gas 103 may be used by the waste treatment system 110 for the biological treatment of the waste. Accordingly, the synergetic system 100 may optionally further comprise a purified exhaust gas transport system 150 coupled to the outlet of the gas purification system 120 and configured to transport the purified exhaust gas 104 to the waste treatment system 110. The purified exhaust gas transport system 150 may comprise piping and optionally one or more further elements such as a pump, a ventilator, a blower or a compressor for transporting the purified exhaust gas 103. For example, the waste treatment system 110 may be configured to use the purified exhaust gas 104 for heating the treatment space in which the biological treatment of the waste 101 takes place. Alternatively or additionally, the waste treatment system 110 may be configured to use the purified exhaust gas 104 for heating the waste 101. The waste treatment system 110 may, e.g., heat wastewater by bubbling or blowing the purified exhaust gas 104 into the wastewater. In other examples, the waste treatment system 110 may be configured to use the purified exhaust gas 104 for adjusting one or more other environmental conditions within the waste treatment system 110 (e.g. a respective concentration of one or more substances such as oxygen in the environment air within the waste treatment system 110).

Figure 2:
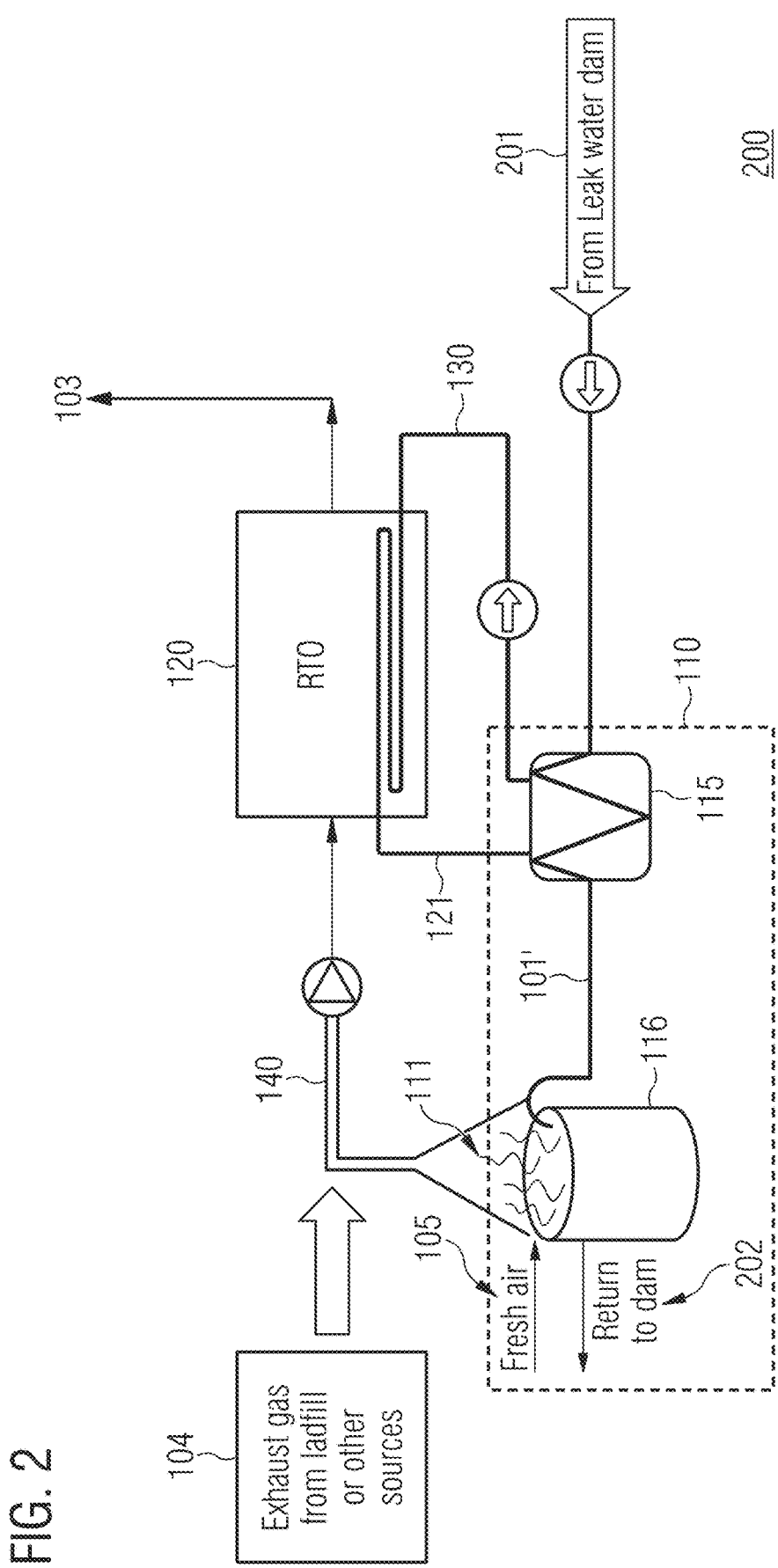
FIG. 2 illustrates a second example of a synergetic system for waste treatment.

FIG. 2 schematically illustrates another exemplary synergetic system 200 for waste treatment. The synergetic system 200 is used for treating wastewater 201 of a landfill. In other words, the treated waste is the wastewater 201 of the landfill. For example, the wastewater 201 may be drain or leak water of the landfill.

A waste treatment system 110 of the synergetic system 200 may, e.g., be coupled to a basin or dam used for collecting the drain or leak water of the landfill. The waste treatment system 110 receives the wastewater 201 and feeds the wastewater 201 into a treatment space 116 such as, e.g., a tank or a basin. The wastewater 201 is biologically treated (e.g. by means of Fenton process) in the treatment space 116 to reduce or remove organic or other substances polluting the landfill drain water.

Purified wastewater 202 is output (emitted, released) by the waste treatment system 110. For example, the purified wastewater 202 may be returned to the basin or dam used for collecting the drain or leak water of the landfill.

Exhaust gas 111 is generated during the biological treatment of the wastewater 201. For example, the exhaust gas 111 may comprise methane or other odorous substances generated during the biological treatment of the wastewater 201. Further, evaporation of the wastewater 201 from the treatment space 116 may cause part of the exhaust gas 111.

An exhaust gas transport system 140 of the synergetic system 200 is configured to collect and transport the exhaust gas 111 from the waste treatment system 110 to a gas purification system 120 of the synergetic system 200. The gas purification system 120 is configured to receive the exhaust gas 111 at an inlet and purify the exhaust gas 111. The gas purification system 120 in the example of FIG. 2 is configured to purify the exhaust gas 111 by RTO. However, it is to be noted that is merely an example. In general, any other suitable technique (e.g. RCO) may be used as well for purifying the exhaust gas 111. The gas purification system 120 is further configured to release the purified exhaust gas 103 at an outlet. For example, the purified exhaust gas 103 may be released to the environment. Heat energy is recovered at the gas purification system 120 and is available as excess heat 121 for other purposes.

A feeding system 130 of the synergetic system 200 is configured to feed the excess heat 121 from the gas purification system 120 back to the waste treatment system 110. As in indicated in FIG. 2, the feeding system 130 may feed a heat transport medium from the waste treatment system 110 to the gas purification system 120 such that the heat transport medium is heated by the excess heat 121 and feed the heated heat transport medium back to the waste treatment system 110.

The waste treatment system 110 comprises a heat exchanger 115. The heat exchanger 115 receives the heated heat transport medium from the feeding system 130 and uses the excess heat 121 stored in the heated heat transport medium for heating the wastewater 201 such that heated wastewater 201 is feed into the treatment space 116.

As the wastewater 201 is heated before it is fed into the treatment space 116, the ambient temperature in the treatment space 116 may be increased. In particular, the ambient temperature in the treatment space 116 may be adjusted to be in a specific temperature in order to increase (optimize) the efficiency of the biological treatment. Accordingly, the treatment of the wastewater 201 may be improved. Further, as the excess heat 121 recovered at the gas purification system 120 is used, no or a smaller amount of external energy is needed for heating the wastewater 201 in the treatment space 116.

In other words, waste heat from the exhaust gas treatment is used to optimize the upstream biological process (in particular the climate conditions) for an optimized waste processing by biological treatment. Further, heating the wastewater 201 by means of the excess heat 121 may allow to reduce the risk that the wastewater 201 freezes in winter such that biological treatment of the wastewater 201 is possible the whole year with increased efficiency. As the exhaust (waste) gas 111 of the biological treatment of the wastewater 201 is used to improve the biological water treatment process, the water treatment may be performed more efficient and with reduced greenhouse gas emission.

In the example of FIG. 2, the gas purification system 120 not only receives and purifies the exhaust gas 111 from the waste treatment system 110. In addition, the gas purification system 120 is configured to receive and purify further exhaust gas 104 from another source such as the landfill itself. Also the landfill emits exhaust gas polluted with harmful and/or odorous substances such as methane. Accordingly, the gas purification system 120 may additionally be used to purify the gaseous emission of the landfill itself.

One component of the exhaust gas 111 as well as the further exhaust gas 104 is methane. The content of organic material in the waste dumped in the landfill decreases over time, so does the methane content of the exhaust gas 111 and the further exhaust gas 104. If a conventional gas burner is used for the exhaust gas purification treatment, a methane content of approx. 30% would be needed to maintain a temperature in the gas purification system required for the oxidation of the exhaust gas(es). In case covered flares without heat recovery for external use would be used for the exhaust gas purification treatment, a methane content of at least 15-20% would be needed to maintain the temperature. In case, the methane concentration is lower, external fuel is needed to maintain the temperature required for oxidation. However, the methane content of the exhaust gas 111 and the further exhaust gas 104 may go below 1% over the lifetime of the landfill such that these techniques are not suitable for the gas purification treatment. On the other hand, RTO may allow autothermal gas purification treatment and heat recovery for gas having a very low energy content (i.e. a very low content of impurities). In particular, RTO may allow autothermal gas purification treatment and heat recovery for methane contents of less than 1%, which makes RTO a suitable purification technique for the gas purification system 120. For example, the RTO may allow to run the synergetic system 200 for more than 25 year. RCO provides similar advantages as RTO may, hence, be used as an alternative by the gas purification system 120.

Similar to what is described above with respect to FIG. 1, the purified exhaust gas 103 may optionally be fed back to the waste treatment system 100. For example, the purified exhaust gas 103 may be injected into the treatment space 116 for temperature optimization. For example, the purified exhaust gas 103 may be bubbled into the wastewater 201 to heat the wastewater 201.

As indicated in FIG. 2, the waste treatment system 110 may be configured to feed fresh air 105 from the surrounding environment to the treatment space 116 for supporting or improving the biological treatment of the wastewater 201.

The treatment of exhaust from a landfill as illustrated in FIG. 2 is merely one exemplary application of the proposed architecture. Similar to what is described above with respect to FIG. 1, the proposed architecture may, e.g., be used for the exhaust gas treatment for wastewater treatment plants using RTO to oxidize the emissions. The proposed energy recovery (e.g. by hot water) may be used to provide heat for processes of the water treatment and, hence, to increase the efficiency of these processes.

While the above description of FIG. 1 and FIG. 2 focused on the overall structure of the proposed architecture, the following description will focus on various aspects of the gas purification system. In particular, various exemplary gas purification techniques and their implementations will be described in the following with respect to FIGS. 3 to 5.

Figure 3:
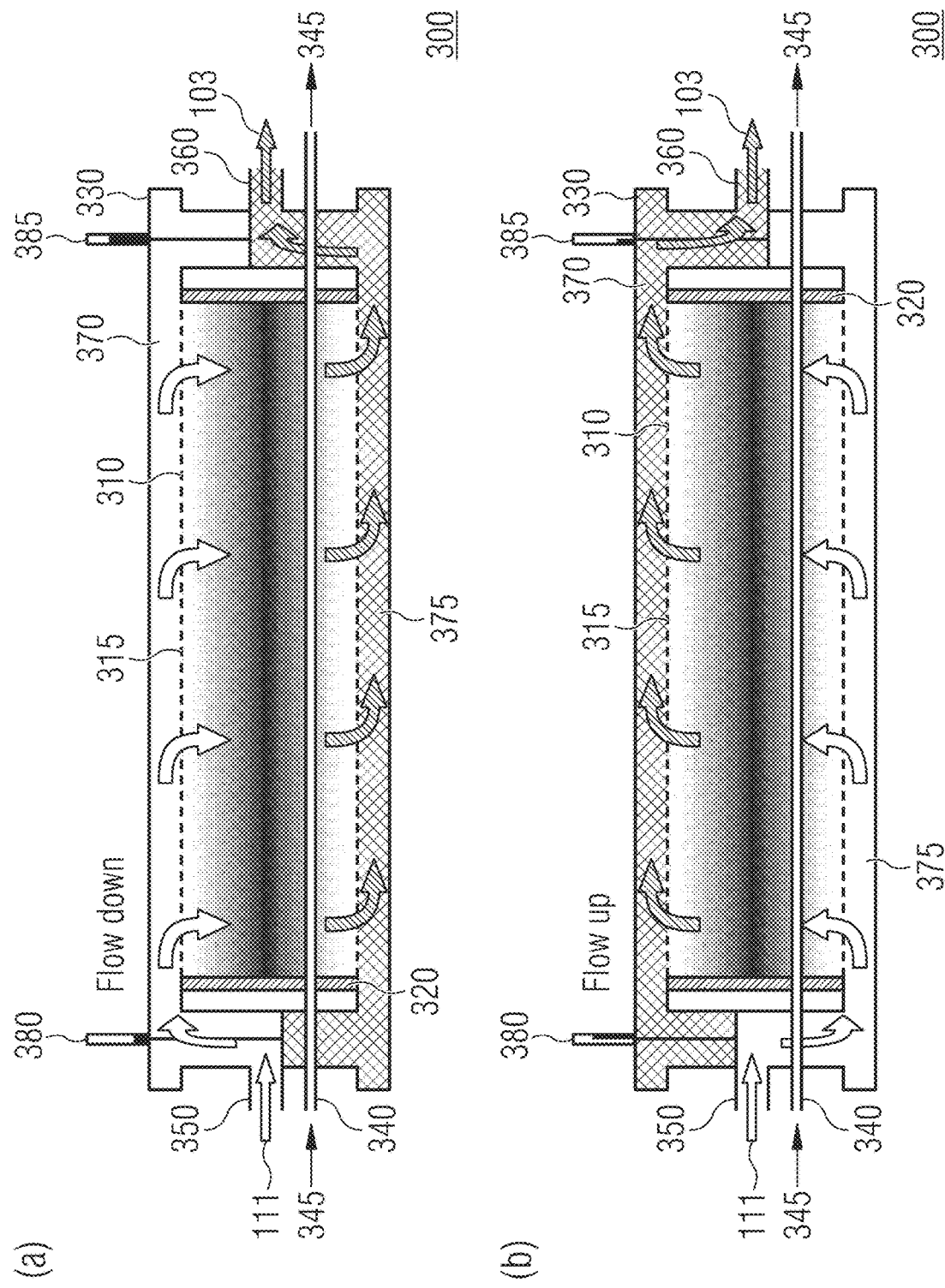
FIG. 3 illustrates a first example of a gas purification system.

FIG. 3 schematically illustrates a sectional view of a gas purification system 300 for flameless RTO of exhaust gas 111. The gas purification system 300 comprises an inlet 350 for receiving the exhaust gas 111. Subfigure (a) of FIG. 3 illustrates a first flow direction of the exhaust gas 111 through the gas purification system 300, whereas subfigure (b) of FIG. 3 illustrates a reverse second flow direction of the exhaust gas 111 through the gas purification system 300.

Further, the gas purification system 300 comprises a single (i.e. exactly/only one) heat-transfer bed 310 filled with porous ceramic material 315 serving as heat-transfer material. The ceramic material 315 may be packed structured or randomly in the heat-transfer bed 310 to form regular or irregular patterns (e.g. ceramic honeycombs or ceramic saddles may be used).

Additionally, the gas purification system 300 comprises an electrical heater 320 (e.g. a grid of electrical coils) configured to initially heat the ceramic material 315 to a predefined temperature (range) suitable for thermal oxidation of the exhaust gas 111. For example, the electrical heater 320 may heat the ceramic material 315 to approx. 1000° C. suitable for thermal oxidation of the exhaust gas 111.

The gas purification system 300 further comprises a gas flow control system 330. Once the ceramic material is heated by the electrical heater 320, the gas flow control system 330 is configured to cause the exhaust gas 111 to flow through the heated ceramic material 315 such that the exhaust gas 111 heats up and oxidates while flowing through the ceramic material 315. In subfigure (a) of FIG. 3, the gas flow control system 330 causes the exhaust gas 111 to flow from the top to the bottom through the heated ceramic material 315. As the exhaust gas 111 passes from the top part to the bottom part of the porous ceramic material 315, Volatile Organic Compounds (VOCs) in the exhaust gas 111 get hot enough to undergo thermal oxidation to water vapor and carbon dioxide. The ceramic media 315 at the bottom part recovers the heat energy in the purified exhaust gas 103. In other words, the ceramic material 315 is configured to store heat released by the exhaust gas 111 during oxidation. The purified exhaust gas 103 is released at an outlet 360 of the gas purification system 300. For example, a temperature of purified exhaust gas 103 may be less than 100° C. higher than that of the exhaust gas 111 (e.g. the temperature may be only 20° C. to 50° C. higher).

The gas flow control system 330 is further configured to periodically reverse a flow direction of the exhaust gas 111 through the ceramic material 315 (e.g. every 90 to 120 seconds). This is illustrated in subfigure (b) of FIG. 3. In subfigure (b) of FIG. 3, the gas flow control system 330 causes the exhaust gas 111 to flow from the bottom to the top through the ceramic material 315. The heat energy previously stored in the bottom part of the ceramic material 315 while the gas flow control system 330 caused the exhaust gas 111 to flow from the top to the bottom through the ceramic material 315 is now used to heat the exhaust gas 111 to the oxidation temperature. Accordingly, the ceramic media 315 at the top part recovers the heat energy in the purified exhaust gas 103.

The periodic reversion of the flow direction of the exhaust gas 111 through the ceramic material 315 may allow to maintain a high heat exchange efficiency of the ceramic material 315 (e.g. higher than 95%). Accordingly, the gas purification system 300 may recover substantially all the heat needed for sustaining the needed oxidation temperature of the heat-transfer bed 310. Further, the periodic reversion of the flow direction of the exhaust gas 111 may allow to maintain a predetermined temperature profile of the heat-transfer bed 310 along the vertical extension of the heat-transfer bed 310. In particular, the periodic reversion of the flow direction of the exhaust gas 111 may allow to keep the hottest zone in the center of the of the heat-transfer bed 310 along the vertical extension of the heat-transfer bed 310.

The gas flow control system 330 is formed by plenums 370, 375 located above and below the heat-transfer bed 310 and a plurality of valves 380, 385 in the example of FIG. 3.

The gas purification system further comprises a heat exchanger 340 arranged in the heat-transfer bed 310. The heat exchanger 340 is configured to transfer heat from the ceramic material 315 to a heat transport medium 345 flowing through the heat exchanger 340. As indicated in FIG. 3, the heat exchanger 340 may be formed by one or more tubes running through the heat-transfer bed 310 such that the and one or more tubes are surrounded by the ceramic material 315. For example, a plurality of tubes may be arranged in one or more layers in the heat-transfer bed 310 to extract heat from the heat-transfer bed 310. The heat transport medium is flowing through the one or more tubes. The vertical position(s) of the one or more tubes or layers may be selected according to the temperature profile of the heat-transfer bed 310. The heat extraction by the heat exchanger 340 may further allow to stabilize a temperature of the purified exhaust gas 103 (e.g. reduce a dependency of the purified exhaust gas 103's temperature from a VOC concentration in the exhaust gas 111).

The heat transport medium may be a gas or a fluid such as water or thermal oil. Using a fluid heat transport medium may be advantageous to using a gaseous heat transport medium as the heat transfer from the solid tube wall to a fluid medium is superior compared to the heat transfer from the solid tube wall to a gaseous medium.

A vertical extension of the hottest zone in the center of the of the heat-transfer bed 310 may depend on a VOC concentration in the exhaust gas 111. A higher VOC concentration in the exhaust gas 111 may result in a greater vertical extension of the hottest zone. Accordingly, more heat energy may be extracted for higher VOC concentrations in the exhaust gas 111.

The heated heat transport medium 345 is transported to the waste treatment system by the feeding system of the proposed synergetic system such that the waste treatment system is able to use the excess heat recovered from the heat-transfer bed 310 for the biological treatment of the waste. In other words, the feeding system is configured to feed the heated heat transport medium 345 to the waste treatment system. Both a closed and an open loop may be used for the heat transport medium.

Figure 4:
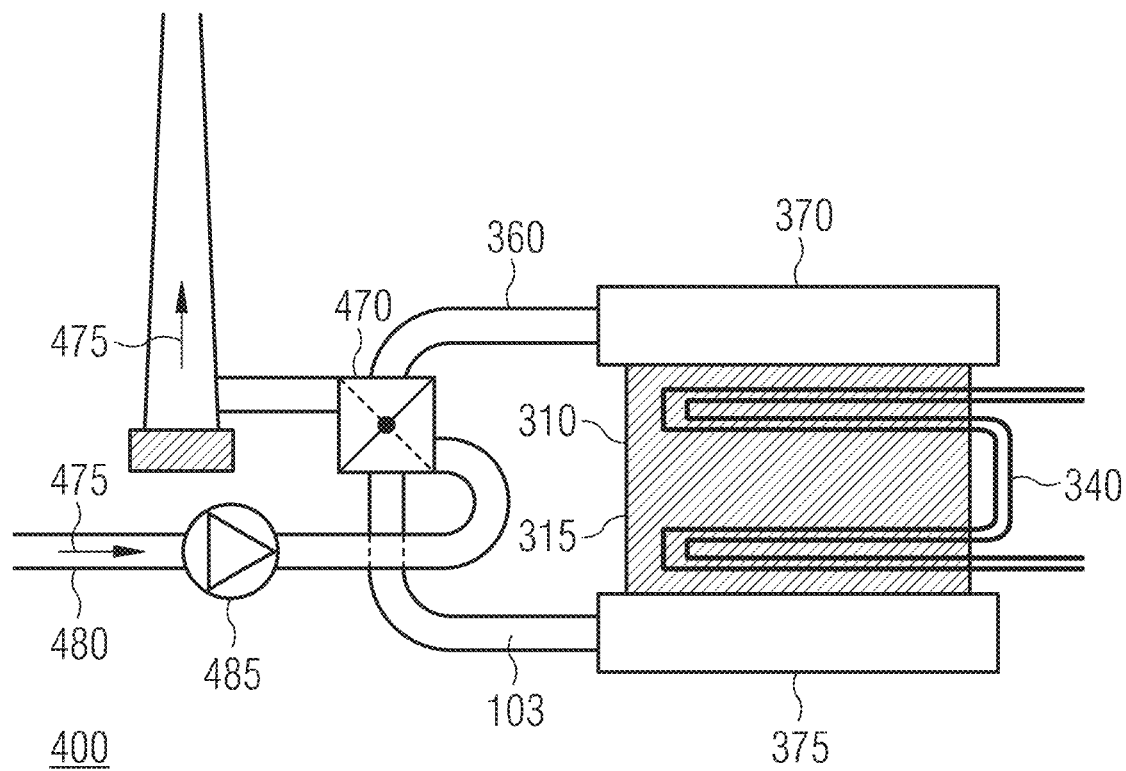
FIG. 4 illustrates a second example of a gas purification system.

The gas purification system 300 may, e.g., allow to recover all thermal energy in case the content of methane in the exhaust gas 111 is just parts of a percent FIG. 4 illustrates an extended variation of the gas purification system 300. In particular, FIG. 4 illustrates a sectional view of a gas purification system 400. In comparison to the gas purification system 300, the gas purification system 400 additionally comprises a heat exchanger 470 coupled to the outlet 360 for releasing the purified exhaust gas 103. The heat exchanger 470 is configured to transfer heat from the purified exhaust gas 103 to a heat transport medium 475 flowing through the heat exchanger 470. The heat transport medium 475 may be a gas or a fluid such as water, steam or thermal oil.

The heat transport medium 475 is fed to the heat exchanger 470 via a piping 480. Optionally, one or more further elements such as a pump 485, a ventilator, a blower or a compressor may be used for transporting the heat transport medium 475 to the heat exchanger 470.

The heat exchanger 470 may allow to recover excess heat from the purified exhaust gas 103 released at the outlet 360.

The heated heat transport medium 475 is transported to the waste treatment system by the feeding system of the proposed synergetic system such that the waste treatment system is able to use the excess heat recovered from the purified exhaust gas 103 for the biological treatment of the waste. In other words, the feeding system is configured to feed the heated heat transport medium 475 to the waste treatment system. Both a closed and an open loop may be used for the heat transport medium.

In the example of FIG. 4, heat is recovered from the heat-transfer bed 310 via the heat exchanger 340 and additionally from the purified exhaust gas 103 via the heat exchanger 470. The gas purification system 400 may allow to recover more excess heat than the gas purification system 300 and, hence, provide an increased amount of excess heat for the biological treatment of the waste.

In some examples, the heat exchanger 340 for recovering heat from the heat-transfer bed 310 may be omitted. In other words, gas purification system according to the present disclosure may only comprise the heat exchanger 470 but not the heat exchanger 340.

Figure 5:
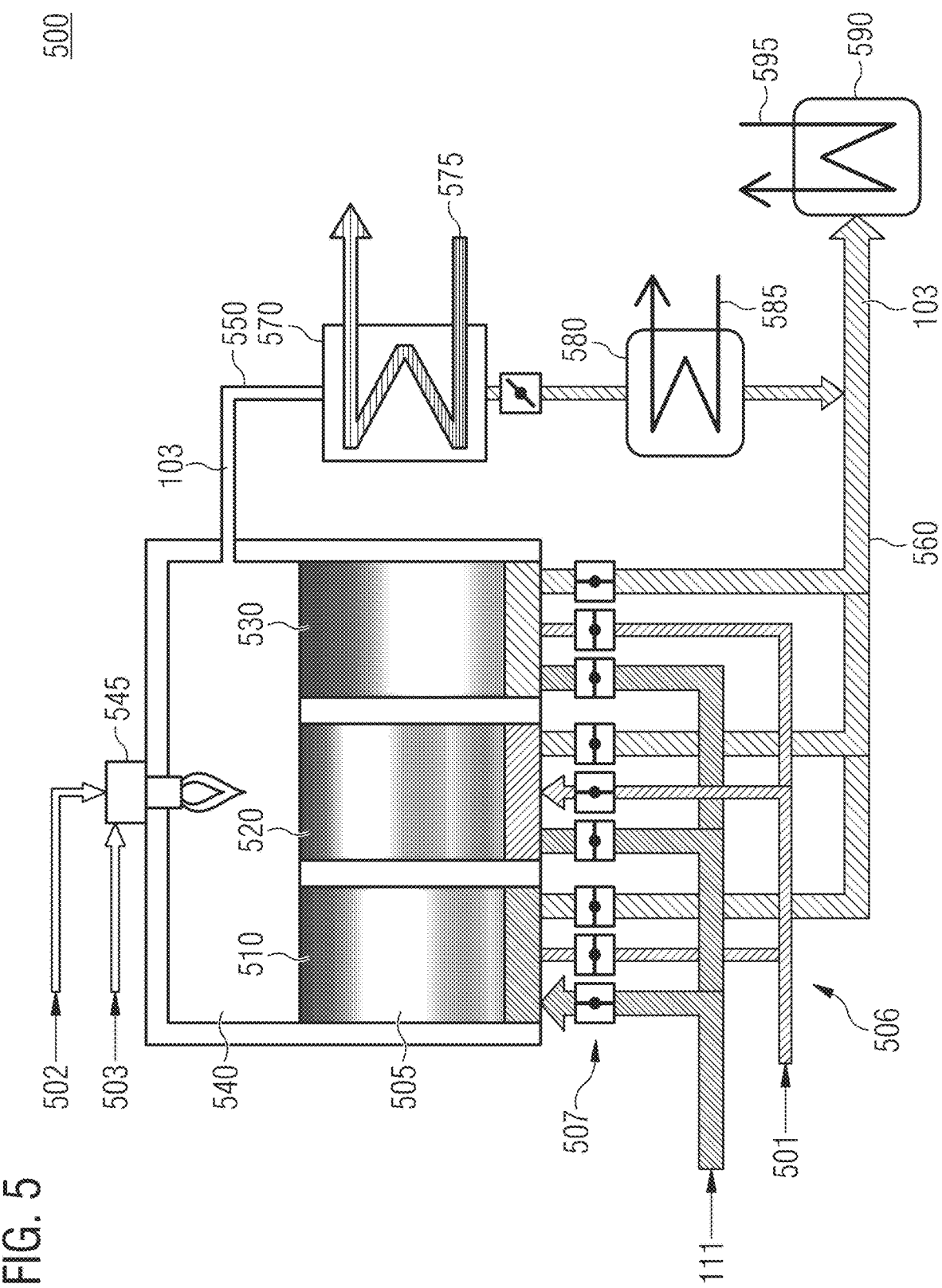
FIG. 5 illustrates a third example of a gas purification system.

FIG. 5 schematically illustrates a sectional view of another gas purification system 500 for RTO of exhaust gas 111. The gas purification system 500 is a three bed tower RTO system.

The gas purification system 500 comprises three vertical heat-transfer beds 510, 520 and 530 each filled with porous ceramic material 505 serving as heat-transfer material. The ceramic material 505 may be packed structured or randomly in the respective heat-transfer bed to form regular or irregular patterns.

A gas flow control system of the gas purification system 500 causes exhaust gas 111 to flow through the heated ceramic material of one of the heat-transfer beds 510, 520 and 530. In the example of FIG. 5, the exhaust gas 111 is caused to flow through the heat-transfer bed 510. As the exhaust gas 111 travels through the heat-transfer bed 510, heat is transferred from the ceramic material 505 to the exhaust gas 111. The heated exhaust gas 111 exits the heat-transfer bed 510 and enters an oxidation chamber 540. A burner 545 heats the oxidation chamber 540 such that the heated exhaust gas 111 oxidates to water and carbon dioxide. As indicated in FIG. 5, the burner 545 is fed with fuel 502 and air 503 for heating the oxidation chamber 540 to a predefined temperature (range) for the oxidation.

The purified exhaust gas 103 is caused by the gas flow control system to flow through the ceramic material 505 of one of other heat-transfer beds 520 and 530 towards an outlet 560 for releasing the purified exhaust gas 103. In the example of FIG. 5, the purified exhaust gas 103 is caused to flow through the heat-transfer bed 530. As the purified exhaust gas 103 travels through the heat-transfer bed 530, the purified exhaust gas 103 transfers most of its heat to the ceramic material 505 of the heat-transfer bed 530 for recovery in a second, reverse cycle.

During this reverse cycle, the gas flow control system causes the exhaust gas 111 to flow through the previously heated ceramic material of the heat-transfer bed 530 and further causes the purified exhaust gas 103 to flow through the ceramic material 505 of the heat-transfer bed 520 towards the outlet 560. The gas flow control system causes purge case 501 to flow through the heat-transfer bed 520 during the initial cycle to purge residual gas of a previous cycle from the heat-transfer bed 520. Similarly, the gas flow control system causes the purge case 501 to flow through the heat-transfer bed 510 during the reverse cycle.

In a third cycle, the gas flow control system causes the exhaust gas 111 to flow through the previously heated ceramic material of the heat-transfer bed 520 and further causes the purified exhaust gas 103 to flow through the ceramic material 505 of the heat-transfer bed 510 towards the outlet 560. The heat-transfer bed 530 is purged during the third cycle.

The three cycles are repeated continuously to alternately cool one of the heat-transfer beds 510, 520 and 530, heat another and purge the third.

The gas flow control system is provided in the example of FIG. 5 by the piping 506 and the plurality of valves 507 for controlling the flow of the exhaust gas 111 and the purge case 501 into the heat-transfer beds 510, 520 and 530 and for controlling the flow of the purified exhaust gas 103 out of the heat-transfer beds 510, 520 and 530.

Excess heat may be recovered in various ways. For example, similarly to what is described above with respect to FIG. 4, a heat exchanger 590 may be coupled to the outlet 560. The heat exchanger 590 is configured to transfer heat from the purified exhaust gas 103 to a heat transport medium 595 flowing through the heat exchanger 590. The heat transport medium 595 may be a gas or a fluid such as water or thermal oil. The heat exchanger 590 may allow to recover excess heat from the purified exhaust gas 103 released at the outlet 360. The heated heat transport medium 595 is transported to the waste treatment system by the feeding system of the proposed synergetic system such that the waste treatment system is able to use the excess heat recovered from the purified exhaust gas 103 for the biological treatment of the waste. Both a closed and an open loop may be used for the heat transport medium.

Optionally, a three bed tower RTO system such as the gas purification system 500 may comprise a bypass 550 configured to divert part of the purified exhaust gas 103 for bypassing the respective one of the heat-transfer beds 510, 520 and 530 used for guiding the remaining purified exhaust gas 103 to the outlet 560. The bypass 550 may also be referred to as "hot bypass" since the purified exhaust gas 103 running (flowing) through the bypass 550 exhibits a significantly higher temperate than the purified exhaust gas 103 released by the respective one of the heat-transfer beds 510, 520 and 530 to the outlet 560. The bypass 550 bypasses the heat-transfer beds 510, 520 and 530 and directly couples the oxidation chamber 540 with the outlet 560.

The gas purification system 500 comprises a heat exchanger 580 coupled to the bypass 550. The heat exchanger 580 is configured to transfer heat from the purified exhaust gas 103 running through the bypass 550 to a heat transport medium 585 flowing through the heat exchanger 580. The heat transport medium 585 may be a gas or a fluid such as water or thermal oil. The heat exchanger 580 may allow to recover excess heat from the hot purified exhaust gas 103 running through the bypass 550. The heated heat transport medium 585 is transported to the waste treatment system by the feeding system of the proposed synergetic system such that the waste treatment system is able to use the excess heat recovered from the purified exhaust gas 103 for the biological treatment of the waste. Both a closed and an open loop may be used for the heat transport medium.

Optionally, the gas purification system 500 may comprise another heat exchanger 570 coupled to the bypass 550 upstream of the heat exchanger 580. The other heat exchanger 570 is configured to transfer heat from the purified exhaust gas 103 running through the bypass 550 to another heat transport medium 575 flowing through the other heat exchanger 570. The other heat transport medium 575 may be a gas or a fluid such as water or thermal oil. Like the heat exchanger 580, the other heat exchanger 570 may allow to recover excess heat from the hot purified exhaust gas 103 running through the bypass 550. The other heat exchanger 570 may allow to recover excess for a heat consuming system different from the above described waste treatment system. For example, the heat consuming system different from the above described waste treatment system may be an industrial system of an industrial plant or a district heating system nearby the gas purification system 500. Accordingly, the proposed synergetic system may in some examples comprise another feeding system configured to feed the heated other heat transport medium 575 to the heat consuming system different from the waste treatment system. Both a closed and an open loop may be used for the other heat transport medium 575. Accordingly, not only the waste treatment system but also another heat consuming system may be provided with the available excess heat from the gas purification.

In the example of FIG. 5, the heat exchanger 570 may allow a high temperature extraction of excess energy and the heat exchanger 580 may allow a low temperature extraction of excess energy.

According to some examples, the gas purification system 500 may comprises a mixer (not illustrated) configured to mix at least part of the purified exhaust gas 103 running through the bypass 505 with a gas stream in order to generate a heated gas stream. The gas purification system 500 may comprise the mixer additionally to the heat exchanger 580 or alternatively to the heat exchanger 580. The gas stream may, e.g., be an air stream. However, it is to be noted that other gases may be used as well. Also the mixer may allow recover excess heat from the hot purified exhaust gas 103 running through the bypass 550. The heated gas stream is transported to the waste treatment system by the feeding system of the proposed synergetic system such that the waste treatment system is able to use the excess heat recovered from the purified exhaust gas 103 for the biological treatment of the waste. Both a closed and an open loop may be used for the heated gas stream. For example, the waste treatment system may use the heated gas stream as process gas for the biological treatment or for heating the processed waste or the treatment space.

It is to be noted that other RTO systems may be used as well for the proposed synergetic system for waste treatment. For example, a three bed tower RTO system with hot gas flushing instead of the purge gas flushing illustrated in FIG. 5 may be used. Similarly, a two bed tower RTO system may be used. For example, the two bed tower RTO may be equipped with a buffer tank or be equipped with lying (i.e. horizontally aligned) beds instead of the vertically aligned beds illustrated in FIG. 5. In general, any multi bed RTO system may be used. Also one bed RTO systems may be used. In some examples, RTO systems with a rotating heat-transfer bed may be used. Alternatively, the heat-transfer bed may be fixed and a distribution and collection system for injecting the exhaust gas into the heat-transfer bed and for collecting the purified exhaust gas leaving the heat-transfer bed may rotate. These gas purification systems for RTO have in common that they comprise a respective gas flow control system configured to:
  a) cause the exhaust gas to flow through heated first ceramic material such that the exhaust gas heats up and oxidates; and
  b) cause the purified exhaust gas to flow through second ceramic material towards an outlet for releasing the purified exhaust gas.

Similar to what is illustrated in FIG. 5, these gas purification systems for RTO may comprise a bypass configured to divert part of the purified exhaust gas for bypassing the second ceramic material.

Excess heat may be recovered in these gas purification systems for RTO in various ways. Similar to what is described above with respect to FIG. 5, a heat exchanger may be coupled to the outlet of the respective gas purification system for RTO to transfer heat from the purified exhaust gas to a heat transport medium flowing through the heat exchanger. In case the respective gas purification system for RTO comprises a bypass, one or more heat-exchangers may be coupled to the bypass (analogously to the heat exchangers 570 and 580 illustrated in FIG. 5) to transfer heat from the purified exhaust gas running through the bypass to a respective heat transport medium flowing through the respective heat exchanger. Additionally or alternatively, a mixer may be coupled to the bypass to mix at least part of the purified exhaust gas running through the bypass with a gas stream in order to generate a heated gas stream. Similar to what is described above with respect to FIG. 5, the heated heat transport medium and the heated gas stream may be feed to the waste treatment system and optionally other heat consuming systems.

The ceramic material in the examples described herein may, e.g., be alumina porcelain, mullite, fireclay (chamotte), cordierite, zircon or a mixture thereof. However, the present disclosure is not limited thereto. Other types of ceramic material may be used as well.

Catalyst material may be provided in addition to the one or more heat-transfer beds of the gas purification systems described above with respect to FIGS. 3 to 5. Accordingly, the needed temperature for oxidizing the exhaust gas may be lower such that the gas purification systems may operate at lower temperatures. For example, one or more layers of catalyst material may be attached to one or both ends of the respective heat-transfer bed along a (possible) flow direction of the exhaust gas. Alternatively or additionally, the ceramic material in the one or more heat-transfer beds (e.g. cordierite) may at least in part be coated with catalyst material. Further alternatively or additionally, catalyst material may be admixed to the ceramic material in the one or more heat-transfer beds. For example, one or more oxidation catalysts and/or one or more reduction catalysts may be used. However, the present disclosure is not limited thereto. Also other types of catalysts may be used. Such gas purification systems may be understood as RCO systems.

Figure 6:
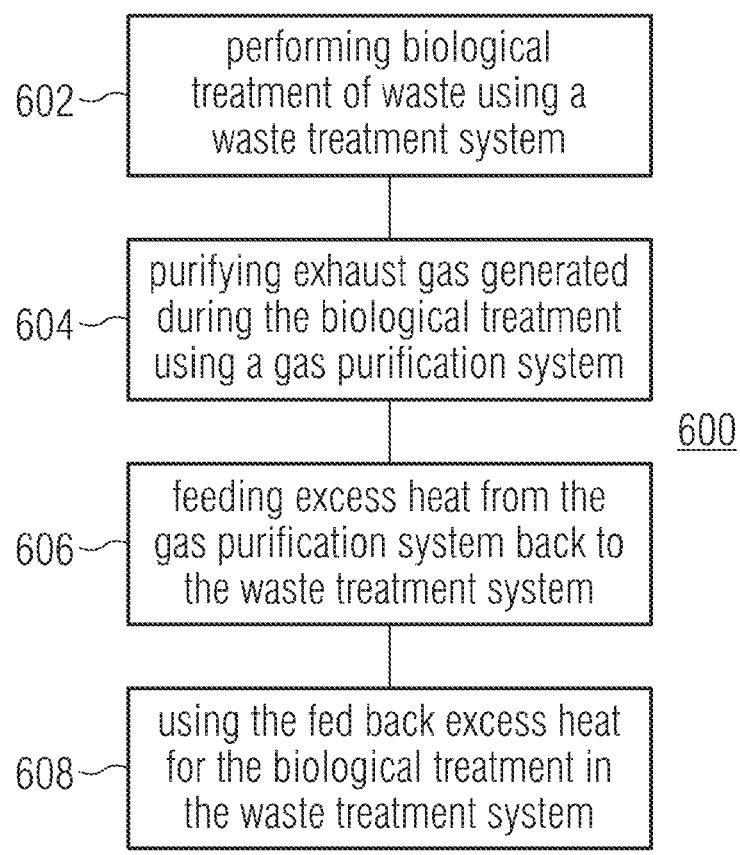
FIG. 6 illustrates a flowchart of an example of a method for waste treatment.

For further illustrating the proposed architecture for waste treatment, FIG. 6 illustrates a flowchart of a method 600 for waste treatment. The method 600 comprises performing 602 biological treatment of waste using (in) a waste treatment system. Additionally, the method 600 comprises purifying 604 exhaust gas generated during the biological treatment of the waste using (in) a gas purification system. The method 600 further comprises feeding 606 excess heat from the gas purification system back to the waste treatment system using a feeding system. In addition, the method 600 comprises using 608 the fed back excess heat for the biological treatment of the waste in the waste treatment system.

The method 600 may allow synergetic operation of the gas purification system and the waste treatment system. In particular, the use of the fed back excess heat for the biological treatment of the waste in the waste treatment system may allow to cover at least part of the energy demand of the waste treatment system. Accordingly, an overall energy consumption for the waste treatment may be reduced according to the proposed technology. Furthermore, the fed back excess energy may allow to optimize the process conditions for the biological treatment of the waste and, hence, allow to perform the biological treatment of the waste with high efficiency.

For example, purifying 604 the exhaust gas may comprise purifying the exhaust gas by (e.g. flameless) RTO or (e.g. flameless) RCO.

In some examples, the gas purification system may comprise a single heat-transfer bed filled with ceramic material. In this case, purifying 604 the exhaust gas may comprise initially heating the ceramic material to a predefined temperature using (by) an electrical heater. Further, purifying 604 the exhaust gas may comprise causing the exhaust gas to flow through the heated ceramic material such that the exhaust gas heats up and oxidates while flowing through the ceramic material. The ceramic material stores heat released by the exhaust gas during oxidation. In addition, purifying 604 the exhaust gas may comprise periodically reversing a flow direction of the exhaust gas through the ceramic material.

Optionally, the gas purification system may further comprise a heat exchanger arranged in the heat-transfer bed. In this case, the method 600 may further comprise transferring heat from the ceramic material to a heat transport medium flowing through the heat exchanger.

Further, feeding 606 the excess heat from the gas purification system back to the waste treatment system may comprise feeding the heated heat transport medium to the waste treatment system. As described above, the heat exchanger may comprise one or more tubes running through the heat-transfer bed and being surrounded by the ceramic material. The heat transport medium is flowing through the one or more tubes.

In other examples, purifying 604 the exhaust gas may comprise causing the exhaust gas to flow through heated first ceramic material such that the exhaust gas heats up and oxidates. Further, purifying 604 the exhaust gas may comprise causing purified exhaust gas to flow through second ceramic material towards an outlet for releasing the purified exhaust gas. In addition, purifying 604 the exhaust gas may comprise using a bypass to divert part of the purified exhaust gas for bypassing the second ceramic material.

In some examples, the gas purification system may comprise a heat exchanger coupled to the bypass. In this case, the method 600 may further comprise transferring heat from the purified exhaust gas running through the bypass to a heat transport medium flowing through the heat exchanger. Further, feeding 606 the excess heat from the gas purification system back to the waste treatment system may comprise feeding the heated heat transport medium to the waste treatment system.

Optionally, the gas purification system may comprise another heat exchanger coupled to the bypass upstream of the heat exchanger. In this case, the method 600 may further comprise transferring heat from the purified exhaust gas running through the bypass to another heat transport medium flowing through the other heat exchanger. In addition, the method 600 may comprise feeding the heated other heat transport medium to a heat consuming system different from the waste treatment system using (by) another feeding system.

Additionally or alternatively, the gas purification system may comprise a mixer. In this case, the method 600 may further comprise mixing at least part of the purified exhaust gas running through the bypass with a gas stream in order to generate a heated gas stream. Further, feeding 606 the excess heat from the gas purification system back to the waste treatment system may comprise feeding the heated gas stream to the waste treatment system.

According to some examples, the gas purification system may comprise an outlet for releasing purified exhaust gas, and a heat exchanger coupled to the outlet. In this case, the method 600 may further comprise transferring heat from the purified exhaust gas to a heat transport medium flowing through the heat exchanger. Further, feeding 606 the excess heat from the gas purification system back to the waste treatment system may comprise feeding the heated heat transport medium to the waste treatment system.

In some examples, the gas purification system further comprises an outlet for releasing purified exhaust gas. In this case, the method 600 may further comprise transporting the purified exhaust gas to the waste treatment system using (by) a purified exhaust gas transport system. Further, using 608 the fed back excess heat for the biological treatment of the waste may comprise using the purified exhaust gas for the biological treatment of the waste.

According to examples, the method 600 may further comprise transporting the exhaust gas from the waste treatment system to the gas purification system using (by) an exhaust gas transport system.

In some examples, the method 600 may further comprise receiving and purifying further exhaust gas from a different source than the waste treatment system at the gas purification system.

As described above, the waste treatment system may comprise a treatment space in which the biological treatment of the waste takes place. In this case, using 608 the fed back excess heat for the biological treatment of the waste may comprise using the fed back excess heat for heating the treatment space.

Additionally or alternatively, using 608 the fed back excess heat for the biological treatment of the waste may comprise using the fed back excess heat for heating the waste.

More details and aspects of the method 600 are explained in connection with the proposed technique or one or more examples described above (e.g. FIGS. 1 to 5). The method 600 may comprise one or more additional optional features corresponding to one or more aspects of the proposed technique or one or more examples described above.

The aspects and features described in relation to a particular one of the previous examples may also be combined with one or more of the further examples to replace an identical or similar feature of that further example or to additionally introduce the features into the further example.

It is further understood that the disclosure of several steps, processes, operations or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

What is claimed is:

1. A synergetic system for waste treatment, comprising:
a waste treatment system configured to perform biological treatment of waste;
a gas purification system configured to purify exhaust gas generated during the biological treatment of the waste, the gas purification system comprising
a single heat-transfer bed filled with ceramic material,
a heat exchanger arranged in the heat-transfer bed, wherein the heat exchanger is configured to transfer heat from the ceramic material to a heat transport medium flowing through the heat exchanger,
a gas flow control system configured to cause the exhaust gas to flow through the ceramic material such
that the exhaust gas oxidates while flowing through the ceramic material, wherein the ceramic material is configured to store heat released by the exhaust gas during oxidation, and
wherein the gas flow control system is further configured to periodically reverse a flow direction of the exhaust; and
a feeding system configured to feed excess heat from the gas purification system back to the waste treatment system via the heated transport medium,
wherein the waste treatment system is further configured to use the fed back excess heat for the biological treatment of the waste.

2. The system of claim 1, wherein the gas purification system is configured to purify the exhaust gas by regenerative thermal oxidation or regenerative catalytic oxidation.

3. The system of claim 2, wherein the gas purification system is configured to purify the exhaust gas by flameless regenerative thermal oxidation or flameless regenerative catalytic oxidation.

4. The system of claim 1, wherein the gas purification system further comprises:
an electrical heater configured to initially heat the ceramic material to a predefined temperature, wherein the gas flow control system is further configured to cause the exhaust gas to heat up while flowing through the heated ceramic material.

5. The system of claim 1, wherein the heat exchanger comprises one or more tubes running through the heat-transfer bed and being surrounded by the ceramic material, wherein the heat transport medium is flowing through the one or more tubes.

6. The system of claim 1, wherein the gas purification system comprises:
an outlet for releasing purified exhaust gas; and
the heat exchanger coupled to the outlet and configured to transfer heat from the purified exhaust gas to the heat transport medium flowing through the heat exchanger, wherein the feeding system is configured to feed the heated heat transport medium to the waste treatment system.

7. The system of claim 1, wherein the gas purification system further comprises an outlet for releasing purified exhaust gas, and wherein the system further comprises a purified exhaust gas transport system configured to transport the purified exhaust gas to the waste treatment system, wherein the waste treatment system is further configured to use the purified exhaust gas for the biological treatment of the waste.

8. The system of claim 1, further comprising an exhaust gas transport system configured to transport the exhaust gas from the waste treatment system to the gas purification system.

9. The system of claim 1, wherein the gas purification system is further configured to receive and purify further exhaust gas from a different source than the waste treatment system.

10. The system of claim 1, wherein the waste treatment system comprises a treatment space in which the biological treatment of the waste takes place, and wherein the waste treatment system is configured to use the fed back excess heat for heating the treatment space.

11. The system of claim 1, wherein the waste treatment system is configured to use the fed back excess heat for heating the waste.

12. A synergetic system for waste treatment, comprising:
a waste treatment system configured to perform biological treatment of waste;
a gas purification system configured to purify exhaust gas generated during the biological treatment of the waste, the gas purification system comprising a gas flow control system and a bypass, the gas flow control system configured to:
cause the exhaust gas to flow through heated first ceramic material such that the exhaust gas heats up and oxidates; and
cause purified exhaust gas to flow through second ceramic material towards an outlet for releasing the purified exhaust gas; and
the bypass configured to divert part of the purified exhaust gas for bypassing the second ceramic material,
a feeding system configured to feed excess heat from the gas purification system back to the waste treatment system,
wherein the waste treatment system is further configured to use the fed back excess heat for the biological treatment of the waste.

13. The system of claim 12, wherein the gas purification system further comprises a heat exchanger coupled to the bypass and configured to transfer heat from the purified exhaust gas running through the bypass to a heat transport medium flowing through the heat exchanger, wherein the feeding system is configured to feed the heated heat transport medium to the waste treatment system.

14. The system of claim 13, wherein the gas purification system comprises another heat exchanger coupled to the bypass upstream of the heat exchanger, wherein the other heat exchanger is configured to transfer heat from the purified exhaust gas running through the bypass to another heat transport medium flowing through the other heat exchanger, and wherein the system comprises another feeding system configured to feed the heated other heat transport medium to a heat consuming system different from the waste treatment system.

15. The system of claim 12, wherein the gas purification system further comprises a mixer configured to mix at least part of the purified exhaust gas running through the bypass with a gas stream in order to generate a heated gas stream, wherein the feeding system is configured to feed the heated gas stream to the waste treatment system.

16. A method for waste treatment, the method comprising:
performing biological treatment of waste using a waste treatment system;
purifying exhaust gas generated during the biological treatment of the waste using a gas purification system, the purifying comprising:

passing the exhaust gas through a single heat-transfer bed filled with ceramic material, periodically reversing the flow direction of the exhaust gas through the ceramic material using a gas flow control system, oxidating the exhaust gas as it flows through the ceramic material, wherein the ceramic material stores heat released by the exhaust gas during oxidation, and transferring heat from the ceramic material to a heat transport medium flowing through a heat exchanger arranged in the heat-transfer bed; and feeding excess heat from the gas purification system back to the waste treatment system via the heated transport medium using a feeding system; and using the fed back excess heat for the biological treatment of the waste in the waste treatment system.

* * * * *